United States Patent Office 3,009,606
Patented Nov. 21, 1961

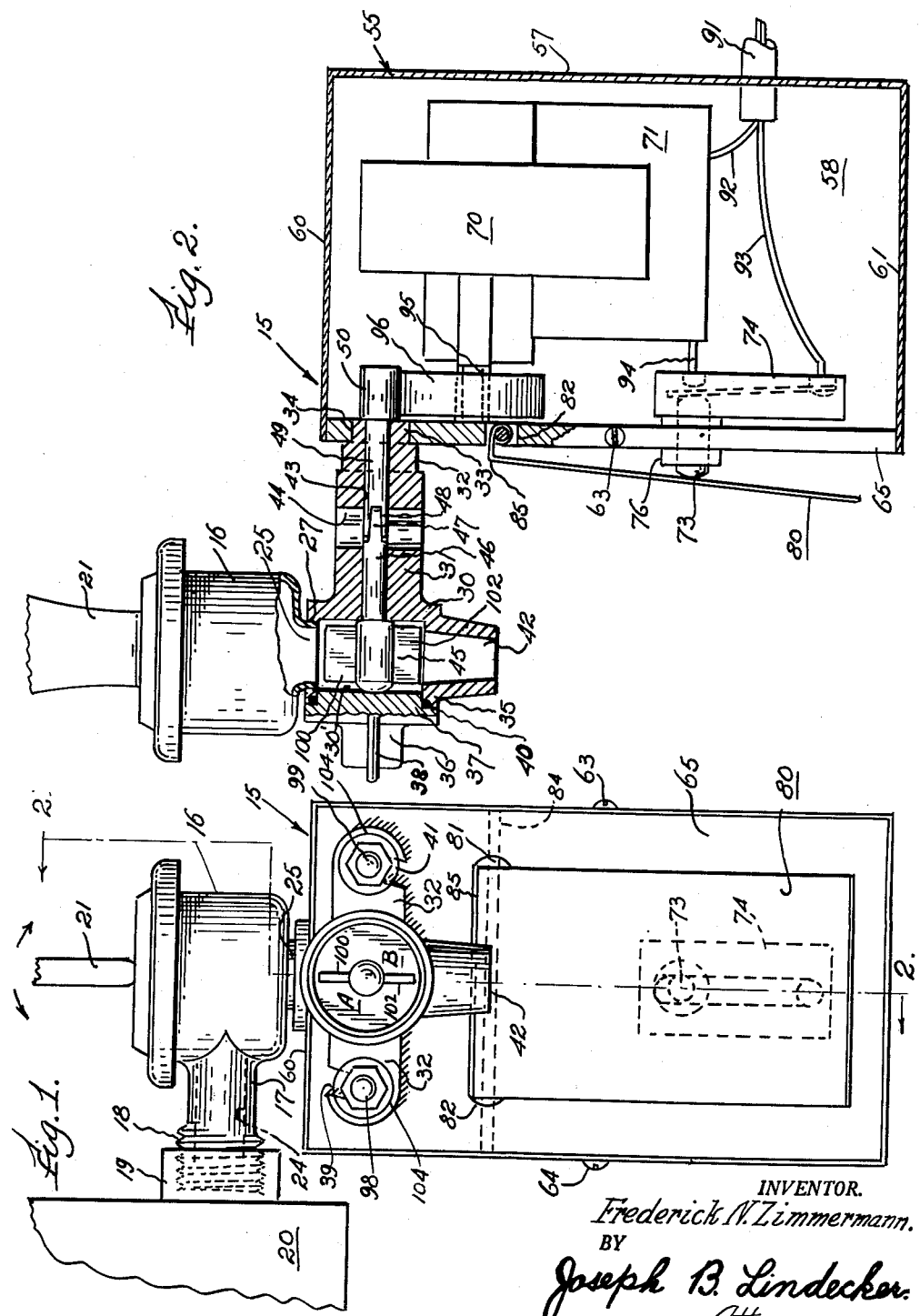

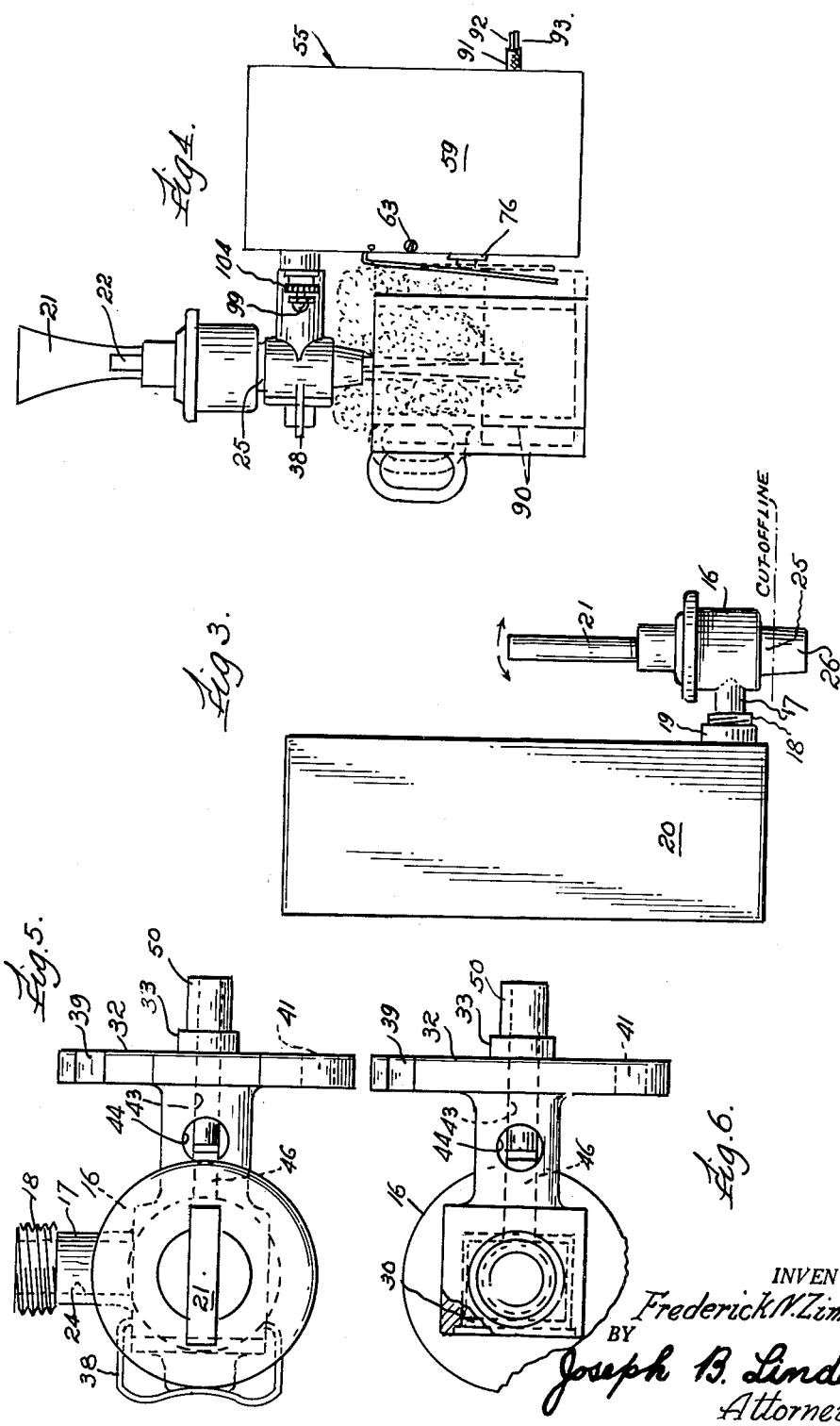

3,009,606
LIQUID WHIPPING AND DISPENSING DEVICE
Frederick N. Zimmermann, Bannockburn, Ill., assignor to March Manufacturing Co., Skokie, Ill., a corporation of Illinois
Filed June 17, 1960, Ser. No. 36,803
1 Claim. (Cl. 222—190)

This invention relates to apparatus for whipping and dispensing liquids, and more particularly to a dispensing structure adapted for quick removal of the valve and agitator chamber assembly for cleaning of the apparatus.

The primary object of the invention resides in providing a novel removable device in which the liquid is agitated as the same is being dispensed.

One object of the invention resides in providing a removable dispensing device in which the liquid is aerated during the flow thereof.

Another object of the invention resides in providing a removable valve assembly for controlling the flow of liquid from the container and further incorporating with the valve an agitator chamber and agitator therein.

A further object of the invention resides in utilizing an electric motor for operating the agitator and in removably mounting said motor and associated switch means on the agitator housing extension means.

A still further object of the invention is the provision of an apparatus in which a beverage may be efficiently agitated at will, so as to whip the beverage into a creamy consistency with foam, while it is being dispensed into a receptacle placed in operative relation thereto and removed therefrom to discharge its contents.

And a still further object of the invention is to provide a beverage dispensing device embodying a beverage container, a valve housing connected with said container, an agitator chamber connected to and below said valve housing, an integral agitator chamber extension means projecting normal to said agitator chamber, a motor assembled in a motor drive enclosure, said enclosure removably mounted upon said chamber extension adjacent a restricted beverage outlet, which motor is receptacle controlled, the placement and removal of the receptacle against a switch arm starting and stopping of the motor.

Other important objects and advantages of the invention, including an improved structure for accomplishing the above objects, will be further apparent and will appear from the following description in the specification and appended drawings.

Referring to the drawings, which illustrate the invention, and in which like characters indicate like parts throughout the several views:

FIGURE 1 is a side elevation of the dispensing device attached to a portion of a liquid container with the agitator chamber cover removed, and the valve housing and associated agitator chamber with the motor drive housing and switch plate mounted upon the agitator chamber extension arm;

FIGURE 2 is a vertical sectional view of the invention, taken substantially on the line 2—2 of FIG. 1, some parts shown by solid lines in full;

FIGURE 3 is a side elevation view of the common type container and dispensing device, without an agitator means;

FIGURE 4 is a front elevational view of the apparatus for whipping and dispensing liquids, a receptacle shown in full lines below the outlet in non-operating position and shown by dotted lines against the switch plate in operative position;

FIGURE 5 is a top plan view of the valve housing and agitator chamber without the motor container assembled therewith; and FIGURE 6 is a bottom plan view of the device shown by FIG. 5, a fragmentary portion shown in section and some parts removed.

The invention is exemplified in a beverage dispensing apparatus, the general numeral 15 indicating the apparatus in its entirety. The dispenser 15 is shown with a valve housing 16, a valve housing extension 17, and a threaded tubular male coupling 18 for mounting the same within a female threaded outlet 19 in the lower portion of a liquid beverage container 20. The valve within the valve housing 16 is of the ordinary construction, provided with an operating handle 21 which is adapted to be tilted forwardly and backwardly in its socket in the top portion of the housing 16 to raise and lower the shaft 22 vertically arranged therewith and extending into the valve housing, and connected with the valve for opening and closing the ports in the valve to the duct 24, shown dotted in extension 17, and the valve discharge nozzle 25. All of these elements described above are embodied in FIGURES 1, 2 and 4 of this invention as well as in the common dispenser shown by FIG. 3.

The usual valve discharge nozzle 25 has considerable length; however, for use with the added elements of this invention, the terminal end 26 is cut off or removed along the "cut-off-line," shown by FIG. 3. The shortened nozzle 25 is inserted within the female opening 27 provided in the top surface of the agitator chamber 30 and brazed therein to form an integral part thereof. Said chamber 30 is formed with a cylindrical side arm extension 31, extending horizontally and normal to said valve extension 17, the terminal end portion of said side extension being provided with an integral cross arm type supporting bracket 32 which extends horizontally and normal thereto; the outer end 33 of said arm extension 31 being cylindrical and adapted to fit into a circular bore 34 in the vertical support plate later to be described. The agitator chamber 30 is provided with a cylindrical cavity 30' of circular vertical cross section defining an aerating cavity with an enlarged bore in the end portion 35 into which is inserted a cover 36 with flange 37 and held in tight engagement with the chamber 30 by means of a bail 38 formed of wire with its ends pivotally secured in small openings in the outer wall of said chamber 30. In order to seal the cover 36 upon the end of the chamber 30, an O ring 40 is arranged in the enlarged bore in the end portion 35. The discharge outlet 42 from said agitator chamber 30 extends downwardly therefrom and is formed with a downwardly and inwardly tapered internal bore. The side arm extension 31 is provided with a horizontal cylindrical bore 43 and a vertical cylindrical bore 44 midway between the ends thereof. The agitator 45 is located axially within the chamber 30 with its horizontal impeller shaft 46, integrally secured thereto, mounted in the forward end portion of cylindrical bore 43, the terminal end 47 of the impeller shaft 46 terminating adjacent the vertical bore 44. The end 47 is tapered to fit within a tapered socket 48 within the adjacent end of the driven shaft 49, forming a separable spade coupling. The vertical bore 44 is provided so one can see the end 47 of said impeller shaft 46 and the socket 48 of drive shaft 49 during assembly thereof.

The driven shaft 49 is integrally formed at its free end with an enlarged cylindrical portion 50, one end thereof in bearing contact with the vertical end wall of side arm extension 31. The cylindrical surface of said portion 50 may be covered with a frictional covering or like means. Said portion 50 extends within the box, or container 55 which encloses the electric motor 70 and switch means 74 associated and assembled together to form a power source for driving the agitator 45. The box 55 has a plurality of closed walls, such as a side wall 57, a rear wall 58, a front wall 59, a top wall 60 and a bottom wall 61. The opposite side of said box 55 is closed by a supporting plate 65, said plate 65 arranged to fit within the peripheral edge portions of walls 58, 59, 60 and 61 and secured to said box by screws 63 and 64 extending through openings in walls 58 and 59 and into threaded bores in the vertical edge portions thereof. The motor 70, and motor-casing 71 of the motor 70 are fixedly secured to the rear wall 58 of the box 55. A spring-pressed button 73, horizontally journalled in hub 76 forming a part of switch case 74, extends through and terminates a short distance outside the box 55 and said supporting plate 65 and operates the switch in the case 74 to close the electrical circuit and cause the motor 70 to run while the button is pushed inwardly and to open said circuit to stop the motor when the button is released. A pressure plate 80 for operating the switch button 73 to control the operation of the motor 70, is pivotally secured to the box 55 by a pin 81 horizontally arranged in the supporting plate 65. Said pressure plate 80 is provided with an elongated horizontal slot, or opening 82, extending across a major portion thereof. A transverse bore 84 is horizontally formed in said support plate 65, extending through the edge portions thereof and joining with and in central alignment with said slot 82. The upper end portion of plate 80 is formed with a transverse rolled bearing portion 85 which surrounds the major portion of pin 81 extending through the slot 82, allowing said plate 80 to pivot with the lower portion thereof in contact with said bottom 73. Inward movement of the lower portion of said plate 80 toward the support plate 65, by contact of a receptacle 90, causes the plate 80 to operate the switch button 73 to start the motor; outward movement of the plate 80 releases the switch-button 73 to stop the motor 70. The switch-button extends in an outer position normally because of a spring means within the case 74, not shown. The electrical energy is supplied by a two-wire conductor 91, one wire 92 thereof extending to the motor and the second wire 93 connected with the switch in switch case 74. A third wire 94 extends between the switch and the motor to make the complete circuit required.

The motor 70 is provided with a horizontal motor drive shaft 95 which is suitably journalled therein. The free end of the drive shaft extends towards and terminates adjacent the support plate 65. A cylindrical roller 96 is rigidly secured to the free end of the motor drive shaft 95 and arranged directly below and in contact with said cylindrical portion 50 of driven shaft 49. The motor 70 causes the motor drive shaft 95 and roller 96 thereon to revolve at 3000 revolutions per minute, and said roller 96 drives cylindrical portion 50 of shaft 49 at a speed of 15,000 revolutions per minute, due to the diameter of the roller 96 being larger than the smaller roller, or cylindrical portion 50. The roller 96 will be referred to as the large driving roller 96 and the enlarged cylindrical portion 50 will be referred to as the small driven roller 50, throughout the remainder of the specification.

The support plate 65 is provided with two studs 98 and 99 with heads thereon, said studs being horizontally aligned with each other and spaced equally from the vertical center line of said plate 65. The supporting bracket 32 which is arranged horizontally and integrally with the side arm extension 31 is provided with two slots 39 and 41; said slot 39 extending upwardly and open at the upper edge of said bracket 32; said slot 41 extending downwardly and open at the lower edge of said bracket 32; said slots spaced from each other the same distance as between said bolts 98 and 99 whereby the bracket 32 which is rigidly supported will receive said bolts 98 and 99 when said box 55 is slightly tilted from its normal vertical axis and arranged thereon. The side extension arm 31 is assembled with the small roller 50 and driven shaft 49 in its bore 43. The box 55 with its motor, switch, and associated elements assembled therein is placed with the support plate 65 adjacent the extension arm 31, the bottom portion of the box 55 is then turned approximately 30 degrees from the vertical so the bore 34 in the plate 65 will pass over the smaller roller 50 and fit upon the extreme end 33 of extension arm 31. The box 55 is returned to its normal vertical position and the bolts 98 and 99 slide into grooves 39 and 41, respectively. Lock nuts 104 are arranged upon each bolt 98 and 99 to lock said box tightly to said bracket 32.

From the above it is clearly seen that once the receptacle 90 is placed against the pressure plate 80 the motor will drive the large roller 3000 r.p.m. and the smaller roller 15,000 r.p.m., thereby turning the impeller, or agitator 15,000 r.p.m. The two impeller, or agitator blades 100 and 102 will be turning in a clockwise direction when viewed from the front of the device. As soon as the valve 21 is moved from its normal position, the beverage in the container 20 will flow into the cylindrical cavity in the agitator chamber 30. The agitator blades 100 and 102 will whip the beverage within the chamber 30, drawing air upwardly through the outlet 42 open to the atmosphere, into the low pressure side and area of the chamber 30, effecting the beverage to become aerated and of a creamy consistency with foam in the high pressure side. The chamber can be considered to have two sides, the side "A" on the left side of the vertical plane considered the low pressure area; the side "B" on the right side of the vertical plane considered the high pressure area when the agitator is rotated in a clockwise direction. The beverage entering by valve discharge nozzle 25 is allowed to flow through the agitator chamber, be whipped within the cylindrical cavity of said agitator chamber and discharged from nozzle 42 into the receptacle 90 below the nozzle and in side contact with said pressure plate 80.

The operation described above is clear, assuming the device to be idle; the container 20 filled with a suitable beverage or hot chocolate syrup, the operator will place the receptacle 90 against the plate 80, starting the motor 70. Movement by the operator of valve handle 21 from the position shown in FIGURE 1 opens the valve, allowing the beverage to pass from the container 20 through the valve nozzle 25 into the cylindrical cavity, or aerating cavity of said agitator chamber 30 where the beverage flow is intercepted by the rapidly rotating agitator 45 and blades 100 and 102 which thoroughly whip and agitates the beverage with air, drawn into the low pressure area of the aerating cavity, to a smooth and creamy consistency with foam. When the receptacle 90 is nearly full, the operator will release his hand from the valve handle 21, the valve will pass to its closed position. The operator then removes the receptacle 90 from against the plate 80 and the control button 73 moves outwardly therewith to its original starting position; and the movement of the button opens the control switch stopping the motor 70 and the agitator with blades 100 and 102.

After operation of the device with beverage, or syrup, the device must be thoroughly cleaned and sterilized. Otherwise the syrup standing therein or adhering to the walls would become contaminated and deleteriously affect syrups subsequently aerated therein. Hot water or other cleaning liquids may be flushed through the agitator chamber, but flushing is incapable of removing particles of syrup adhering to surfaces in the agitator not easily accessible by the hot water. Therefore, it is necessary that the agitator and valve be removed from the container 20, whereby it can also be sterilized. The lock nuts 104 are turned in counter clockwise direction to loosen the bolts from the bracket 32. The box is then grasped and turned in a clockwise direction as viewed by FIG. 1, thereby removing the bolts 98 and 99 from the slots 39 and 40. The box is then withdrawn horizontally from the bracket. The integral unit embodying the valve and agitator chamber is then turned in a counter clockwise direction removing the threaded male coupling 18 from the female threaded outlet 19 in the lower portion of the syrup container 20. This allows the container 20 to be drained and sterilized. The bail is then removed from the cover 36 whereby the agitator and its integral shaft 46 are easily removed. The small roller 50 and its integral driven shaft 49 are then removed. The O ring 40 can be sterilized with other loose parts. After the above mentioned parts are cleaned, said parts are reassembled and the valve inserted into the bore 19 and rotated in a clockwise direction. The motor box is then re-assembled upon the side arm extension 31 and locked thereon by locking nuts 104, and ready for operation on a new supply of beverage or syrup.

It is believed obvious that this arrangement of the parts of the mixer facilitates the cleaning thereof, thereby making certain that there will be no contamination of the beverage, or syrup, processed therein.

I claim as my invention:

In a dispensing device for liquids, the combination of a liquid beverage container, a valve body provided with an inlet and a vertical discharge outlet, a valve body extension with a threaded male end portion, a threaded female opening in the lower portion of said liquid beverage container for receiving said threaded male portion, a valve member disposed within said valve body, a valve operating lever attached to said valve member and extending above said valve body, said valve body wholly supported by said liquid beverage container, an agitator chamber disposed below and connected with the bottom portion of said valve body, a cylindrical cavity within said agitator chamber, an inlet in said agitator chamber joining said cylindrical cavity with said discharge outlet in said valve body, said agitator chamber having an inwardly and downwardly tapered restricted discharge outlet joining said cylindrical cavity with the exterior of said agitator chamber, said agitator chamber having an extension projecting horizontally therefrom, a motor container wholly supported by said agitator chamber extension, a motor supported within said motor container, said motor container removably secured to and disposed exteriorly of said agitator chamber extension, an agitator rotatably mounted in said cylindrical cavity within said agitator chamber, an impeller shaft connected with said agitator and connected with driven means extending outside said agitator chamber, a motor drive shaft connected with said motor, means on the outer end of said drive shaft for driving said driven means with said impeller shaft, and a control means for said motor for rotating said motor drive shaft comprising a switch operatively coupled to a switch operating means consisting of a pressure plate pivotally mounted upon a vertical exterior wall of said motor supporting container, movement of said switch operating means in a direction toward said switch and away from the normal position rendering the motor operative, movement of said switch operating means to its normal position rendering said motor inoperative, and said pressure plate being of rectangular configuration with a top curled edge portion pivotally mounted upon a cylindrical pin mounted transversely with said vertical wall of said motor container.

References Cited in the file of this patent
UNITED STATES PATENTS

| | | |
|---|---|---|
| 1,574,745 | Anketell | Mar. 2, 1926 |
| 2,775,877 | Bruntjen | Jan. 1, 1957 |
| 2,855,007 | Erickson et al. | Oct. 7, 1958 |
| 2,919,726 | Zimmerman et al. | Jan. 5, 1960 |